US012373328B2

(12) United States Patent
He (10) Patent No.: US 12,373,328 B2
(45) Date of Patent: Jul. 29, 2025

(54) CODE CONSTRUCTION METHOD AND DEVICE, APPARATUS, AND STORAGE MEDIUM

(71) Applicant: ZTE CORPORATION, Guangdong (CN)

(72) Inventor: Hongjun He, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 176 days.

(21) Appl. No.: 18/010,014

(22) PCT Filed: Jun. 10, 2021

(86) PCT No.: PCT/CN2021/099361
§ 371 (c)(1),
(2) Date: Dec. 13, 2022

(87) PCT Pub. No.: WO2021/254243
PCT Pub. Date: Dec. 23, 2021

(65) Prior Publication Data
US 2023/0251952 A1     Aug. 10, 2023

(30) Foreign Application Priority Data
Jun. 15, 2020   (CN) .......................... 202010543411.0

(51) Int. Cl.
*G06F 11/362*     (2025.01)
*G06F 11/3668*    (2025.01)
(52) U.S. Cl.
CPC ...... *G06F 11/3624* (2013.01); *G06F 11/3692* (2013.01)

(58) Field of Classification Search
CPC .................... G06F 11/3624; G06F 11/3692
See application file for complete search history.

(56) References Cited

U.S. PATENT DOCUMENTS 7,404,110 B1 *  7/2008  Johnson ................ G06F 11/263
                                                      714/736
7,519,953 B2 *  4/2009  Reissman ............ G06F 11/3672
                                                      717/124

(Continued)

FOREIGN PATENT DOCUMENTS

CN     101470620 A     7/2009
CN     108052344 A     5/2018
(Continued)

OTHER PUBLICATIONS

WIPO, International Search Report issued on Jul. 7, 2021.
(Continued)

*Primary Examiner* — Douglas M Slachta
(74) *Attorney, Agent, or Firm* — Li & Cai Intellectual Property (USA) Office (57) ABSTRACT

A code construction method and device, an apparatus and a storage medium are provided. The method includes: generating (S110) at least two test construction commands according to different environment variables in a code construction command; respectively executing (S120) the at least two test construction commands on a code, and adjusting (S120), if execution results are inconsistent, the code construction command according to the environment variables in the code construction command; and executing (S130) the adjusted code construction command on the code.

12 Claims, 2 Drawing Sheets

(56) References Cited

U.S. PATENT DOCUMENTS

| | | | |
|---|---|---|---|
| 7,725,507 B1* | 5/2010 | van Rietschote | G06F 16/10 707/828 |
| 9,021,443 B1* | 4/2015 | Lachwani | G06F 11/3698 717/124 |
| 9,875,174 B1* | 1/2018 | Brandwine | G06F 11/3409 |
| 10,198,347 B1* | 2/2019 | Dunn | G06F 11/3684 |
| 10,503,500 B2 | 12/2019 | Tameshige et al. | |
| 11,954,015 B2* | 4/2024 | Vezier | G06F 30/3308 |
| 2006/0265629 A1* | 11/2006 | Kwong | G06F 11/3688 714/38.1 |
| 2008/0307264 A1* | 12/2008 | de Halleux | G06F 11/3688 714/38.1 |
| 2009/0006897 A1* | 1/2009 | Sarsfield | G06F 11/3684 714/38.14 |
| 2010/0229188 A1* | 9/2010 | Baratakke | G06F 16/16 719/328 |
| 2010/0293533 A1 | 11/2010 | Andrade et al. | |
| 2013/0159989 A1* | 6/2013 | Deckert | G06F 8/61 717/172 |
| 2013/0179735 A1* | 7/2013 | Buckhurst | G01R 31/2834 714/E11.207 |
| 2014/0115565 A1* | 4/2014 | Abraham | G06F 11/368 717/131 |
| 2015/0067642 A1* | 3/2015 | Chen | G06F 8/71 717/121 |
| 2016/0004517 A1* | 1/2016 | Safary | G06F 8/436 717/131 |
| 2016/0170864 A1* | 6/2016 | Li | G06F 11/3684 717/126 |
| 2018/0060066 A1* | 3/2018 | Rihani | G06F 8/71 |
| 2018/0246803 A1* | 8/2018 | Zhang | G06F 11/3688 |
| 2019/0146902 A1* | 5/2019 | Jiang | G06F 11/3688 717/129 |
| 2020/0125485 A1* | 4/2020 | Wiener | G06F 11/3698 |
| 2021/0081304 A1* | 3/2021 | Masis | G06F 11/3692 |
| 2023/0088784 A1* | 3/2023 | Negussie | G06N 20/00 717/102 |

FOREIGN PATENT DOCUMENTS

| | | |
|---|---|---|
| CN | 110941424 A | 3/2020 |
| CN | 112799649 A | 5/2021 |
| JP | H04337846 A | 11/1992 |
| JP | 2010086110 A | 4/2010 |
| WO | WO 2018042584 A1 | 3/2018 |

OTHER PUBLICATIONS

Japan Patent Office, JP2022-554637 First Office Action issued on Sep. 5, 2023.
European Patent Office, EP21826277.2 Extended European Search Report issued on Oct. 25, 2023.

* cited by examiner

CODE CONSTRUCTION METHOD AND DEVICE, APPARATUS, AND STORAGE MEDIUM

CROSS-REFERENCE TO RELATED APPLICATIONS

The present disclosure claims the priority to Chinese Patent Application No. 202010543411.0 filed on Jun. 15, 2020, the entire contents of which are incorporated herein by reference.

TECHNICAL FIELD

The present disclosure relates to, but is not limited to, the field of computers.

BACKGROUND

Nowadays, auditing requirements for codes become stricter and stricter, and more and more extensive in consideration of security, and auditing of binary equivalence of the codes also becomes an important index.

There are two general methods for auditing of the binary equivalence of the codes in the industry: a passive analysis method and an active defense method.

With the passive analysis method, a plurality of code construction results are compared, and it is demonstrated by analysis that a difference between the results is caused by factors which do not affect program logic, such as a timestamp, a random number and a file order, so that binary equivalence of a code to be audited is indirectly proved.

With the active defense method, a project source code is analyzed in advance to find factors which may possibly affect binary equivalence of the code, such as the timestamp, the random number, the file order and a character set, and the factors are modified to be constants on the premise that program logic is not affected, so as to realize binary consistency of a plurality of construction results, thereby proving binary equivalence of the code to be audited.

SUMMARY

In a first aspect, the present disclosure provides a code construction method, including: generating at least two test construction commands according to different environment variables in a code construction command; respectively executing the at least two test construction commands on a code, and adjusting, in response to execution results being inconsistent, the code construction command according to the environment variables in the code construction command; and executing the adjusted code construction command on the code.

In a second aspect, the present disclosure provides a code construction device, including: a generation module configured to generate at least two test construction commands according to different environment variables in a code construction command; an adjustment module configured to respectively execute the at least two test construction commands on a code, and adjust, in response to execution results being inconsistent, the code construction command according to the environment variables in the code construction command; and an execution module configured to execute the adjusted code construction command on the code.

In a third aspect, the present disclosure provides an apparatus, including: one or more processors; and a storage device configured to store one or more programs; the one or more programs, when executed by the one or more processors, cause the one or more processors to carry out the method described herein.

In a fourth aspect, the present disclosure provides a storage medium storing a computer program which, when executed by a processor, causes the processor to carry out the method described herein.

DETAIL DESCRIPTION OF EMBODIMENTS

In order to make the objectives, technical solutions and advantages of the present disclosure clearer, implementations of the present disclosure are further described in detail below in conjunction with the drawings. It should be noted that the implementations described herein and the features therein can be arbitrarily combined with one another if no conflict is incurred.

The operations illustrated in the flowchart of the drawings may be performed in a computer system such as a set of computer-executable instructions. In addition, although a logical order is illustrated in the flowchart, the operations illustrated or described may be performed in an order different from that described herein in some cases.

Nowadays, the auditing requirements for the codes become stricter and stricter, and more and more extensive in consideration of security, and the auditing of the binary equivalence of the codes also becomes an important index.

There are two general methods for auditing of the binary equivalence of the codes in the industry: the passive analysis method and the active defense method.

With the passive analysis method, a plurality of code construction results are compared, and it is demonstrated by analysis that a difference between the results is caused by factors which do not affect program logic, such as the timestamp, the random number and the file order, so that binary equivalence of a code to be audited is indirectly proved. However, this method, i.e., performing passive analysis when faced with a difference, has the following disadvantages: (1) poor timeliness: if analysis is performed merely after the difference is found, a time requirement of a user can hardly be met, and a difference analysis report cannot be provided for the user in time; (2) poor reusability: due to low reusability of an analysis result, a large amount of time-consuming and labor-consuming analysis work may have to be repeated after a project is replaced; and (3) low analysis efficiency: since a difference is transmitted in a construction process, a minor difference at the beginning of the construction process can cause a large difference between final results, and for finding a root cause of the difference between the construction results, reverse tracing and layer-by-layer analysis are needed when passive analysis is carried out, resulting in an analysis process which is time-consuming and labor-consuming and is low in efficiency.

With the active defense method, a project source code is analyzed in advance to find factors which may possibly affect binary equivalence of the code, such as the timestamp, the random number, the file order and the character set, and the factors are modified to be constants on the premise that program logic is not affected, so as to realize binary consistency of a plurality of construction results, thereby proving binary equivalence of the code to be audited. However, this method has the following disadvantages: (1) poor reusability: since the work of analyzing and modifying the project source code cannot be reused, complex work of project analysis and modification has to be repeated after the project is replaced; and (2) low analysis efficiency: the project needs to be analyzed manually, resulting in a heavy workload, and omissions may occur.

Figure 1:
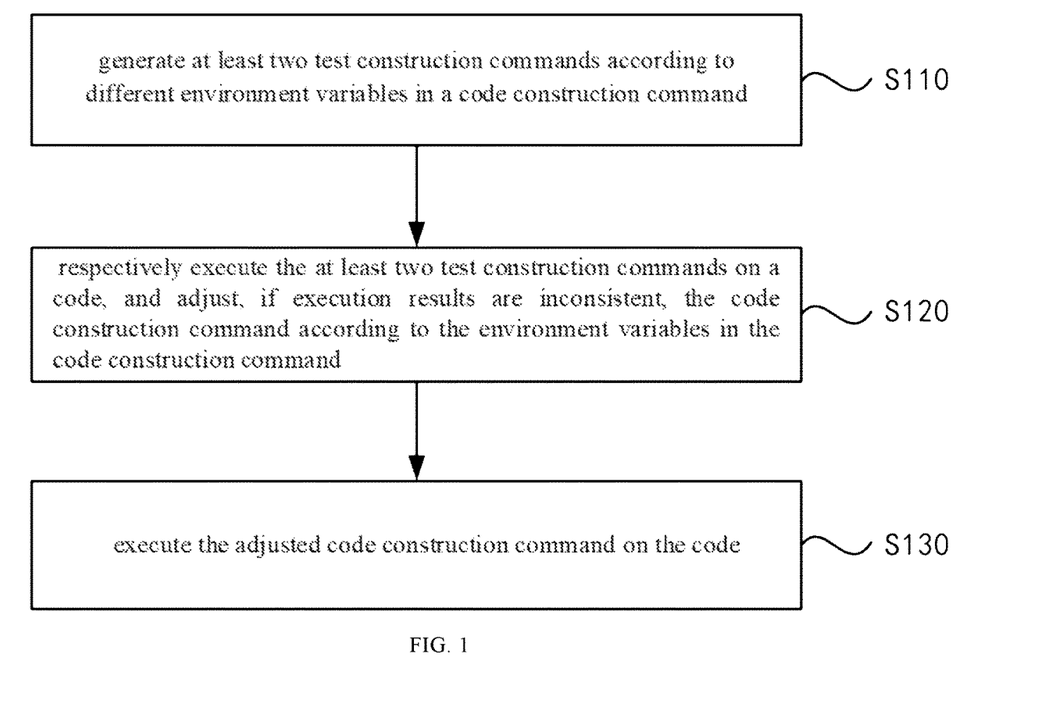
FIG. 1 is a flowchart illustrating a code construction method according to the present disclosure.

FIG. 1 is a flowchart illustrating a code construction method according to the present disclosure. The method may be applicable to a binary audit of a code, and may be performed by a code construction device. The code construction device may be implemented by software and/or hardware and integrated on an apparatus which may be a computer apparatus.

As shown in FIG. 1, the code construction method provided by the present disclosure includes operations S110, S120 and S130.

In operation S110, at least two test construction commands are generated according to different environment variables in a code construction command.

The environment variables include: at least one of a user name, system time, a timestamp, a random number, a file order or a character set.

The environment variables are variables included in the code construction command. For example, if the code construction command is a command to generate an archive file, the environment variable is the timestamp.

The different environment variables may be environment variables of different types, or different values corresponding to a same type of environment variable. For example, the different environment variables may be a timestamp A and a timestamp B, or may be the timestamp A and a user name C, which is not limited herein.

In an implementation, a project construction process, which refers to a process of binary conversion of a code, is tracked, a code construction command executed in the project construction process is monitored, execution of the code construction command is suspended, and at least two test construction commands are generated according to different environment variables. For example, the project construction process, which refers to the process of binary conversion of the code, is tracked, the code construction command executed in the project construction process is monitored, the execution of the code construction command is suspended, if the environment variables are system time A and system time B, one test construction command is generated according to the system time A, and one test construction command is generated according to the system time B; or, if the environment variables are the system time A and the user name C, one test construction command is generated according to the system time A, and one test construction command is generated according to the user name C; or, if the environment variables are a timestamp Q, a random number M and the user name C, one test construction command is generated according to the timestamp Q, one test construction command is generated according to the random number M, and one test construction command is generated according to the user name C; or, if the environment variables are the system time A, the system time B, and system time P, one test construction command is generated according to the system time A, one test construction command is generated according to the system time B, and one test construction command is generated according to the system time P.

In operation S120, the at least two test construction commands are respectively executed on the code, and if execution results are inconsistent, the code construction command is adjusted according to the environment variables in the code construction command.

Respectively executing the at least two test construction commands on the code may include the following operations. For example, if the environment variables are the system time A and the system time B, one test construction command is generated according to the system time A, one test construction command is generated according to the system time B, the test construction command generated according to the system time A is executed on the code, and the test construction command generated according to the system time B is executed on the code; if the environment variables are the system time A, the system time B and the system time P, one test construction command is generated according to the system time A, one test construction command is generated according to the system time B, one test construction command is generated according to the system time P, the test construction command generated according to the system time A is executed on the code, the test construction command generated according to the system time B is executed on the code, and the test construction command generated according to the system time P is executed on the code; or, if the environment variables are the timestamp Q, the random number M, and the user name C, one test construction command is generated according to the timestamp Q, one test construction command is generated according to the random number M, one test construction command is generated according to the user name C, the test construction command generated according to the timestamp Q is executed on the code, the test construction command generated according to the random number M is executed on the code, and the test construction command generated according to the user name C is executed on the code.

In an implementation, if the execution results are inconsistent, adjusting the code construction command according to the environment variables in the code construction command may include the following operations. For example, if the environment variables are the system time A and the system time B, one test construction command is generated according to the system time A, one test construction command is generated according to the system time B, the test construction command generated according to the system time A is executed on the code, the test construction command generated according to the system time B is executed on the code, an execution result obtained by executing the test construction command generated according to the system time A on the code is the execution result X, an execution result obtained by executing the test construction command generated according to the system time B on the code is the execution result Y, and the execution results are inconsistent because the execution result X is different from the execution result Y, then the code construction command is adjusted according to the system time; if the environment variables are the system time A, the system time B and the system time P, one test construction command is generated according to the system time A, one test construction command is generated according to the system time B, one test construction command is generated according to the system time P, the test construction command generated according to the system time A is executed on the code, the test construction command generated according to the system time B is executed on the code, the test construction command generated according to the system time P is executed on the code, an execution result obtained by executing the test construction command generated according to the system time A on the code is the execution result X, an execution result obtained by executing the test construction command generated according to the system time B on the code is the execution result Y, an execution result obtained by executing the test construction command generated according to the system time P on the code is the execution result Z, and the execution results are inconsistent because the execution result X, the execution result Y and the execution result Z are different from one another, then the code construction command is adjusted according to the system time; or, if the environment variables are the timestamp Q, the random number M, and the user name C, one test construction command is generated according to the timestamp Q, one test construction command is generated according to the random number M, one test construction command is generated according to the user name C, the test construction command generated according to the timestamp Q is executed on the code, the test construction command generated according to the random number M is executed on the code, the test construction command generated according to the user name C is executed on the code, an execution result obtained by executing the test construction command generated according to the timestamp Q on the code is the execution result X, an execution result obtained by executing the test construction command generated according to the random number M on the code is the execution result X, an execution result obtained by executing the test construction command generated according to the user name C on the code is the execution result Y, and the execution results are inconsistent because the execution results X and the execution result Y are different from one another, then the code construction command is adjusted according to the timestamp, the random number and the user name.

In operation S130, the adjusted code construction command is executed on the code.

In an implementation, executing the adjusted code construction command on the code may include the following operations. For example, if the environment variable is the timestamp, system time of the code construction command is adjusted to a fixed value, and the code construction command with the system time adjusted to the fixed value is executed on the code; and if the environment variable is a file list order, the code construction command is adjusted to be a command to sort, after the execution results are obtained, the execution results with a sorting tool, and the adjusted code construction command is executed on the code.

By generating the at least two test construction commands according to the different environment variables in the code construction command, respectively executing the at least two test construction commands on the code, adjusting, if the execution results are inconsistent, the code construction command according to the environment variables in the code construction command, and executing the adjusted code construction command on the code, the code construction method provided by the present disclosure can allow a plurality of code construction results to be consistent, and automatically realize reproducible code construction.

On the basis of the above implementations, modified implementations of the above implementations are proposed. It should be noted that merely the differences from the above implementations are described in the following modified implementations for the purpose of conciseness.

In an implementation, adjusting the code construction command according to the environment variables in the code construction command includes: searching a database according to the code construction command to obtain a first adjustment rule corresponding to the code construction command; and adjusting each environment variable in the code construction command according to the first adjustment rule.

A database about corresponding relationships between code construction commands and adjustment rules is established in advance. For example, the database stores a code construction command W and adjustment rules of all environment variables in the code construction command W; a code construction command G and adjustment rules of all environment variables in the code construction command G; and a code construction command K and adjustment rules of all environment variables in the code construction command K.

The first adjustment rule may include adjustment rules of all the environment variables in the code construction command. For example, if the code construction command includes an environment variable D and an environment variable E, the first adjustment rule includes an adjustment rule of the environment variable D and an adjustment rule of the environment variable E.

In an implementation, searching the database according to the code construction command to obtain the first adjustment rule corresponding to the code construction command and adjusting each environment variable in the code construction command according to the first adjustment rule may include the following operations. For example, the database is searched according to the code construction command W to obtain the adjustment rules of all the environment variables in the code construction command W; if all the environment variables in the code construction command W are the environment variable D and the environment variable E, the adjustment rule of the environment variable D and the adjustment rule of the environment variable E are obtained, the environment variable D in the code construction command W is adjusted according to the adjustment rule of the environment variable D, and the environment variable E in the code construction command W is adjusted according to the adjustment rule of the environment variable E.

In an implementation, adjusting each environment variable in the code construction command according to the first adjustment rule includes: if the code construction command includes the timestamp, setting system time corresponding to the code construction command to be fixed time; if the code construction command includes the random number, building a target file system, and replacing a file system corresponding to the code construction command with the target file system so as to allow files to be archived to have fixed node information; and if the code construction command includes the file list order, sorting at least one execution result corresponding to the code construction command with a sorting tool.

The code construction command may include at least one of the timestamp (environment variable), the random number (environment variable) or the file list order (environment variable).

In an implementation, setting the system time corresponding to the code construction command to be the fixed time if the code construction command includes the timestamp, building the target file system and replacing the file system corresponding to the code construction command with the target file system so as to allow the files to be archived to have the fixed node information if the code construction command includes the random number, and sorting the at least one execution result corresponding to the code construction command with the sorting tool if the code construction command includes the file list order may include the following operations. For example, if the code construction command includes the timestamp alone, merely the system time corresponding to the code construction command needs to be set to be the fixed time; if the code construction command includes the timestamp and the random number, the system time corresponding to the code construction command needs to be set to be the fixed time, the target file system needs to be built, and the file system corresponding to the code construction command needs to be replaced with the target file system so as to allow the files to be archived to have the fixed node information; and if the code construction command includes the timestamp, the random number and the file list order, the system time corresponding to the code construction command needs to be set to be the fixed time, the target file system needs to be built, the file system corresponding to the code construction command needs to be replaced with the target file system so as to allow the files to be archived to have the fixed node information, and the at least one execution result corresponding to the code construction command needs to be sorted with the sorting tool.

In an implementation, adjusting the code construction command according to the environment variables in the code construction command includes: searching a database according to environment variables corresponding to the at least two test construction commands to obtain a second adjustment rule corresponding to the environment variables; and adjusting the environment variables according to the second adjustment rule.

A database about corresponding relationships between the environment variables and adjustment rules is established in advance. For example, the database includes the environment variable D and the adjustment rule of the environment variable D, an environment variable R and an adjustment rule of the environment variable R, and an environment variable H and an adjustment rule of the environment variable H.

The second adjustment rule may include adjustment rules of the environment variables corresponding to the test construction commands.

In an implementation, the environment variable that causes the inconsistency of the execution results is determined in advance according to the test construction commands, and the number of the environment variables that cause the inconsistency of the execution results may be one or more than one. For example, when it is determined according to the test construction commands that the environment variable that causes the inconsistency of the execution results is the environment variable D, the database is searched to obtain the adjustment rule of the environment variable D, and the environment variable D is adjusted according to the adjustment rule of the environment variable D.

It should be noted that the code construction command may include a plurality of environment variables, and the number of the environment variables that cause the inconsistency of the execution results may be one or more than one. For example, the code construction command includes an environment variable Q, the environment variable D, and the environment variable R, and the environment variable that causes the inconsistency of the execution results is the environment variable Q; or, the code construction command includes the environment variable Q and the environment variable D, and the environment variables that cause the inconsistency of the execution results are the environment variable Q and the environment variable D; and if the environment variables that cause the inconsistency of the execution results are the environment variable Q and the environment variable D, the database is searched according to the environment variable Q to obtain an adjustment rule of the environment variable Q, and is searched according to the environment variable D to obtain the adjustment rule of the environment variable D.

In an example, the code construction command includes the environment variable Q, the environment variable D and the environment variable R, so that a test construction command N1 is generated according to the environment variable Q1 in the code construction command, a test construction command N2 is generated according to the environment variable Q2 in the code construction command, a test construction command V1 is generated according to the environment variable D1 in the code construction command, a test construction command V2 is generated according to the environment variable D2 in the code construction command, a test construction command U1 is generated according to the environment variable R1 in the code construction command, and a test construction command U2 is generated according to the environment variable R2 in the code construction command; and if an execution result of the test construction command N1 is consistent with that of the test construction command N2, an execution result of the test construction command V1 is inconsistent with that of the test construction command V2, an execution result of the test construction command U1 is consistent with that of the test construction command U2, then the database is searched according to the environment variable D to obtain the adjustment rule of the environment variable D, and the environment variable D is adjusted according to the adjustment rule of the environment variable D.

In an implementation, adjusting the environment variables according to the second adjustment rule includes: if the environment variable in the code construction command is the timestamp, setting system time corresponding to the code construction command to be fixed time.

The fixed time may be set by a system or set manually, which is not limited herein.

In an implementation, if the environment variable in the code construction command is the timestamp, setting the system time corresponding to the code construction command to be the fixed time may include the following operations. For example, it is detected that a reason for irreproducible construction in a project is the timestamp: for example, in a case where a tar tool is used to generate an archive file (since a timestamp is generated in a file header according to current system time when an archive file is generated according to a tar command, binary inconsistency of archive files generated by executing the same tar command twice occurs due to different timestamps in the file headers); and the database is searched to find a corresponding adjustment rule, for example, for the tar command to generate an archive file, a new tar command is built by a monitoring module, and system time of execution of the tar command is set to be the same fixed time, thus ensuring binary consistency of archive files generated by executing the same tar command for a plurality times.

In an implementation, adjusting the environment variables according to the second adjustment rule includes: if the environment variable in the code construction command is the random number, building a target file system; and replacing a file system corresponding to the code construction command with the target file system so as to allow files to be archived to have fixed node information.

In an implementation, if the environment variable in the code construction command is the random number, building the target file system, and replacing the file system corresponding to the code construction command with the target file system so as to allow the files to be archived to have the fixed node information may include the following operations. For example, it is detected that a reason for irreproducible construction in a project is the random number: for example, in a case where a cpio file is generated and inode of a file packed into the cpio file is a random number; and the database is searched to find a corresponding adjustment rule, for example, a random problem of inode of a file packed into a cpio file is generated (an independent file system such as ext4 is built, files to be packed are sequentially copied into the independent file system to be given a fixed inode value, and then a cpio file is generated in the independent file system, so that binary consistency of cpio files generated in a plurality of construction processes can be realized).

In an implementation, adjusting the environment variables according to the second adjustment rule includes: if the environment variable in the code construction command is the file list order, sorting at least one execution result corresponding to the code construction command with a sorting tool.

In an implementation, if the environment variable in the code construction command is the file list order, sorting the at least one execution result corresponding to the code construction command with the sorting tool may include the following operations. For example, it is detected that irreproducible construction in a project is caused by the file list order: for example, in a case where a find command is executed and a sequence of a plurality of results found is not fixed; and the database is searched to find a corresponding adjustment rule, for example, for the find command, the plurality of results found are sorted with a sorting tool such as sort, so that results found by executing the find command for a plurality of times are consistent.

In an implementation, generating the at least two test construction commands according to the different environment variables in the code construction command includes: tracking a code construction process, and monitoring the code construction command executed in the code construction process; when the code construction command is acquired, suspending execution of the code construction command; and generating the at least two test construction commands according to the different environment variables in the code construction command.

In an example, a whole project construction process is tracked; code construction commands executed in the project construction process are monitored; execution of a current code construction command is suspended; two test construction commands are built, and are configured with different environment variables (factors such as the user name and the system time which may cause irreproducible construction); the two newly built test construction commands are sequentially executed; and output results of the two test construction commands are compared, and it is determined that the current code construction command is a code construction command which cannot be reproducibly constructed if the output results are inconsistent.

In another example, a project construction process is monitored (by using ptrace, for example); an environment variable causing irreproducible construction in the project is detected; an adjustment rule corresponding to the environment variable is found in a database; the environment variable is adjusted according to the adjustment rule to obtain a new code construction command; an original code construction command is replaced with the new code construction command; and the new code construction command is executed.

According to the present disclosure, adjustment rules of environment variables causing irreproducible construction are provided in advance, and stored in a database; and after a new adjustment rule is obtained, the new adjustment rule is added to the database to update the database in real time.

According to the present disclosure, an existing analysis result of irreproducible construction can be reused to automatically position and repair the environment variable causing the irreproducible construction in the project construction process, without modifying a project source code, so that binary consistency of a plurality of construction processes can be ensured, thereby conveniently achieving an audit of code binary equivalence.

In another example, a project construction process is monitored; it is detected that a reason for irreproducible construction in the project is the timestamp: for example, in a case where a tar tool is used to generate an archive file (since a timestamp is generated in a file header according to current system time when an archive file is generated according to a tar command, binary inconsistency of archive files generated by executing the same tar command twice occurs due to different timestamps in the file headers); the database is searched according to the timestamp to find an adjustment rule corresponding to the timestamp, for example, for the tar command to generate an archive file, a new tar command is built by a monitoring module, and system time of execution of the tar command is set to be the same fixed time, thus ensuring binary consistency of archive files generated by executing the same tar command for a plurality times; and the timestamp is adjusted according to the adjustment rule to obtain the adjusted code construction command, and the adjusted code construction command is executed on the code.

In another example, a project construction process is monitored; it is detected that a reason for irreproducible construction in the project is the random number: for example, in a case where a cpio file is generated and inode of a file packed into the cpio file is a random number; and the database is searched according to the random number to find an adjustment rule corresponding to the random number, for example, a random problem of inode of a file packed into a cpio file is generated (an independent file system such as ext4 is built, files to be packed are sequentially copied into the independent file system to be given a fixed inode value, and then a cpio file is generated in the independent file system, so that binary consistency of cpio files generated in a plurality of construction processes can be realized); and the code construction command is adjusted according to the adjustment rule, and the adjusted code construction command is executed on the code.

In another example, a project construction process is monitored; it is detected that a reason for irreproducible construction in the project is the file list order: for example, in a case where a find command is executed and a sequence of a plurality of results found is not fixed; and the database is searched according to the file list order to find an adjustment rule corresponding to the file list order, (for example, for the find command, the plurality of results found are sorted with a sorting tool such as sort, so that results found by executing the find command for a plurality of times are consistent), and the code construction command is adjusted according to the adjustment rule, and the adjusted code construction command is executed on the code.

In another example, project construction is initiated; the project construction is monitored; code construction commands executed in the project construction process are monitored; execution of a current code construction command is suspended; two test construction commands are built (different environment variables are configured to allow the two commands to use different factors such as the system time and the user name which may cause irreproducible construction); the first test construction command is executed; the second test construction command is executed; execution results of the two test construction commands are compared, and if binary inconsistency of the execution results occurs, a reason for irreproducible construction is positioned; the execution of the suspend command is resumed; and the construction process is detected, the operation of monitoring the code construction commands executed in the project construction process is performed if the construction is not completed, and the flow is ended if the construction is completed.

In another example, a database is established, with the data base storing environment variables which cause binary inconsistency of a plurality of construction processes, and adjustment rules of the environment variables; project construction is initiated; the project construction is monitored; an environment variable which causes irreproducible construction is detected; an adjustment rule of the detected environment variable which causes the irreproducible construction is acquired from the database; and the environment variable is adjusted according to the adjustment rule to obtain an adjusted code construction command. The adjusted code construction command is executed, the construction process is detected, the operation of monitoring code construction commands executed in the project construction process is performed if the construction is not completed, and the flow is ended if the construction is completed.

Figure 2:
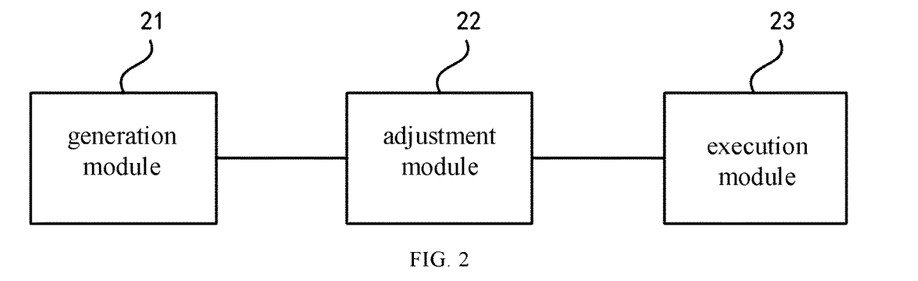
FIG. 2 is a schematic structural diagram of a code construction device according to the present disclosure.

The present disclosure further provides a code construction device. FIG. 2 is a schematic structural diagram of the code construction device provided by the present disclosure, and the device is installed in a computer apparatus. With reference to FIG. 2, the device includes: a generation module 21 configured to generate at least two test construction commands according to different environment variables in a code construction command; an adjustment module 22 configured to respectively execute the at least two test construction commands on a code, and adjust, if execution results are inconsistent, the code construction command according to the environment variables in the code construction command; and an execution module 23 configured to execute the adjusted code construction command on the code.

The code construction device provided by the present disclosure is configured to implement the code construction method provided by the present disclosure, and an implementation principle and a technical effect of the code construction device provided by the present disclosure are similar to those of the code construction method provided by the present disclosure, and thus will not be repeated here.

On the basis of the above implementation, modified implementations of the above implementation are proposed. It should be noted that merely the differences from the above implementation are described in the following modified implementations for the purpose of conciseness.

In an implementation, the adjustment module 22 may be configured to search a database according to the code construction command to obtain a first adjustment rule corresponding to the code construction command, and adjust each environment variable in the code construction command according to the first adjustment rule.

In an implementation, the adjustment module 22 may be configured to search a database according to an environment variable in the code construction command to obtain a second adjustment rule corresponding to the environment variable, and adjust the environment variable according to the second adjustment rule.

In an implementation, the adjustment module 22 may be configured to set, if the environment variable in the code construction command is a timestamp, system time corresponding to the code construction command to be fixed time.

In an implementation, the adjustment module 22 may be configured to build, if the environment variable in the code construction command is a random number, a target file system, and replace a file system corresponding to the code construction command with the target file system, so as to allow files to be archived to have fixed node information.

In an implementation, the adjustment module 22 may be configured to sort, if the environment variable in the code construction command is a file list order, at least one execution result corresponding to the code construction command with a sorting tool.

In an implementation, the adjustment module 22 may be configured to track a code construction process, monitor the code construction command executed in the code construction process, suspend, when the code construction command is acquired, execution of the code construction command, and generate the at least two test construction commands according to the different environment variables in the code construction command.

The code construction device provided by the present disclosure includes the generation module configured to generate the at least two test construction commands according to the different environment variables in the code construction command; the adjustment module configured to respectively execute the at least two test construction commands on the code, and adjust, if the execution results are inconsistent, the code construction command according to the environment variables in the code construction command; and the execution module configured to execute the adjusted code construction command on the code. Thus, the code construction device can reuse an existing analysis result of irreproducible construction to automatically find, repair or avoid a factor causing irreproducible construction in a project construction process, with no need to manually modify a project source code by a user, so as to realize binary consistency of a plurality of construction processes, thereby increasing an auditing efficiency of code validity.

Figure 3:
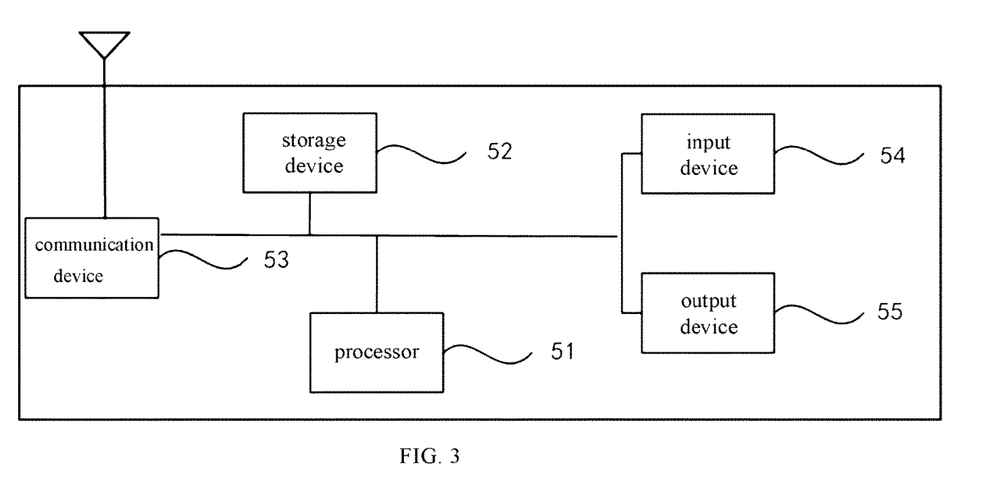
FIG. 3 is a schematic structural diagram of an apparatus according to the present disclosure.

The present disclosure further provides an apparatus, and FIG. 3 is a schematic structural diagram of the apparatus provided by the present disclosure. As shown in FIG. 3, the apparatus provided by the present disclosure includes one or more processors 51 and a storage device 52; the one or more processors 51 may be provided in the device, and FIG. 3 illustrates an example where one processor 51 is provided; the storage device 52 is configured to store one or more programs; and the one or more programs are executed by the one or more processors 51 to cause the one or more processors 51 to implement the method described herein.

The apparatus further includes: a communication device 53, an input device 54 and an output device 55.

The processor 51, the storage device 52, the communication device 53, the input device 54 and the output device 55 in the apparatus may be connected through a bus or by other means, and FIG. 3 illustrates an example where the above devices are connected through the bus.

The input device 54 may be configured to receive input numeric or character information and generate input of key signals related to user settings and function control of the apparatus. The output device 55 may include a display device such as a display screen.

The communication device 53 may include a receiver and a transmitter, and is configured to receive and transmit information for communication under the control of the processor 51. The information includes, but is not limited to, uplink authorization information.

As a computer-readable storage medium, the storage device 52 may be configured to store software programs, computer-executable programs and modules, such as program instructions/modules (e.g., the generation module 21, the adjustment module 22 and the execution module 23 in the code construction device) corresponding to the code construction method shown in FIG. 1 of the present disclosure. The storage device 52 may include a program storage region and a data storage region, the program storage region is capable of storing an operating system, and at least one application program needed by function; and the data storage region is capable of storing data created according to use of the apparatus. Further, the storage device 52 may include a high-speed random access memory, and may also include a non-volatile memory, such as at least one of magnetic storage device, a flash memory, or other non-volatile solid-state memories. In some examples, the storage device 52 may further include a memory remotely arranged relative to the processor 51, and the remote memory may be connected to the apparatus via a network. The examples of the above network include, but are not limited to, the Internet, an intranet, a local area network, a mobile communication network, and the combinations thereof.

The present disclosure further provides a storage medium having a computer program stored thereon. The computer program, when executed by a processor, causes the processor to implement the code construction method described herein.

The computer storage medium provided by the present disclosure may be one computer-readable medium or any combination of a plurality of computer-readable media. The computer-readable medium may be a computer-readable signal medium or a computer-readable storage medium. The computer-readable storage medium may be, but is not limited to, for example, an electronic system, apparatus or device, a magnetic system, apparatus or device, an optical system, apparatus or device, an electromagnetic system, apparatus or device, an infrared system, apparatus or device, a semiconductor system, apparatus or device, or any combination thereof. Specific examples of the computer-readable storage medium include (a non-exhaustive list): an electrical connector having one or more wires, a portable computer disk, a hard disk, a Random Access Memory (RAM), a Read Only Memory (ROM), an Erasable Programmable Read Only Memory (EPROM), a flash memory, an optical fiber, a portable Compact Disc Read-Only Memory (CD-ROM), an optical storage device, a magnetic storage device, or any suitable combination thereof. The computer-readable storage medium may be any tangible medium that contains or stores a program capable of being used by or together with an instruction execution system, apparatus or device.

The computer-readable signal medium may include a data signal which is propagated at a baseband or propagated as a part of a carrier, and the data signal carries computer-readable program codes. The data signal such propagated may take a plurality of forms, and includes, but is not limited to, an electromagnetic signal, an optical signal, or any suitable combination thereof. The computer-readable signal medium may be any computer-readable medium except for the computer-readable storage medium, and the computer-readable storage medium is capable of sending, propagating, or transferring a program configured to be used by or together with an instruction execution system, apparatus or device.

The program codes carried on the computer-readable medium may be transferred with any proper medium that includes, but is not limited to, a wireless medium, a wire, an optical fiber, a Radio Frequency (RF) medium, or any suitable combination thereof.

The computer program codes for performing the operations described in the present disclosure may be written in one or more programming languages, or in a combination of a plurality of programming languages, and the programming languages include object-oriented programming languages such as Java, Smalltalk and C++, and also include conventional procedural programming languages, such as C or similar programming languages. The program codes may be executed on a user's computer totally or partially, or executed as a stand-alone software package, or executed partially on the user's computer and partially on a remote computer, or executed totally on the remote computer or a remote server. In a case where the remote computer is involved, the remote computer may be connected to the user's computer through any type of networks, including a Local Area Network (LAN) or a Wide Area Network (WAN), or may be connected to an external computer (for example, through the Internet via an Internet service provider).

The above description is merely of the exemplary implementations of the present disclosure, and is not intended to limit the scope of the present disclosure.

It should be understood by those of ordinary skill in the art that the term "User Equipment" indicates any wireless user equipment of a suitable type, such as a mobile phone, a portable data processing device, a portable web browser or a vehicle mobile station.

In general, the various implementations of the present disclosure may be implemented by hardware or special circuits, software, logic or any combination thereof. For example, some aspects of the present disclosure may be implemented by hardware and other aspects may be implemented by firmware or software executable by a controller, a microprocessor or other computing device, but the present disclosure is not limited thereto.

The implementations of the present disclosure may be implemented by a data processor of a mobile device executing computer program instructions. For example, the implementations of the present disclosure are implemented in a processor entity, or by hardware, or by a combination of software and hardware. The computer program instructions may be assembly instructions, Instruction Set Architecture (ISA) instructions, machine instructions, machine-related instructions, microcode, firmware instructions, state setting data, or source code or object code written in one programming language or in any combination of a plurality of programming languages.

A block diagram illustrating any logic flow in the drawings of the present disclosure may show operations of a program, or interconnected logic circuits, modules and functions, or a combination of the operations of the program and the logic circuits, modules and functions. The computer program can be stored on the memory. The memory may be in any type suitable to local technical environment and may be implemented using any suitable data storage technology. For example, the memory is, but not limited to, an ROM, an RAM, and an optical storage device and system (a Digital Video Disc (DVD) or a Compact Disc (CD)). The computer-readable medium may include a non-transitory storage medium. The data processor may be in any type suitable to the local technical environment. For example, the data processor is, but not limited to, a general-purpose computer, a special purpose computer, a microprocessor, a Digital Signal Processors (DSP), an Application Specific Integrated Circuit (ASIC), a Field-Programmable Gate Array (FGPA) and a processor based on multi-core architecture.

The exemplary implementations of the present disclosure are illustrated in detail above by exemplary and non-limiting examples. For those of ordinary skill in the art, various modifications and adjustments to the above implementations can be obviously derived from the accompanying drawings and the appended claims, but those modifications and adjustments are not beyond the scope of the present disclosure. Therefore, the proper scope of the present disclosure is defined by the appended claims.

What is claimed is:

1. A code construction method, comprising:
generating at least two test construction commands according to different environment variables in a code construction command;
respectively executing the at least two test construction commands on a code, and adjusting, in response to execution results being inconsistent, the code construction command according to the environment variables in the code construction command; and
executing the adjusted code construction command on the code,
wherein adjusting the code construction command according to the environment variables in the code construction command comprises:
searching a database according to the code construction command to obtain a first adjustment rule corresponding to the code construction command; and
adjusting each environment variable in the code construction command according to the first adjustment rule,
wherein adjusting each environment variable in the code construction command according to the first adjustment rule comprises:
in response to the code construction command comprising a timestamp, setting system time corresponding to the code construction command to be fixed time;
in response to the code construction command comprising a random number, building a target file system, and replacing a file system corresponding to the code construction command with the target file system to allow files to be archived to have fixed node information; and
in response to the code construction command comprising a file list order, sorting at least one execution result corresponding to the code construction command with a sorting tool.

2. The method of claim 1, wherein generating the at least two test construction commands according to the different environment variables in the code construction command comprises:
tracking a code construction process, and monitoring the code construction command executed in the code construction process;
suspending, when the code construction command is acquired, execution of the code construction command; and
generating the at least two test construction commands according to the different environment variables in the code construction commands.

3. A code construction device, comprising a processor and a memory having instructions stored thereon which, when executed by the processor, cause the processor to carry out the method of claim 1.

4. A non-transitory storage medium storing a computer program which, when executed by a processor, causes the processor to carry out the method of claim 1.

5. A code construction method, comprising:
generating at least two test construction commands according to different environment variables in a code construction command;
respectively executing the at least two test construction commands on a code, and adjusting, in response to execution results being inconsistent, the code construction command according to the environment variables in the code construction command; and
executing the adjusted code construction command on the code,
wherein adjusting the code construction command according to the environment variables in the code construction command comprises:
searching a database according to environment variables corresponding to the at least two test construction commands to obtain a second adjustment rule corresponding to the environment variables; and
adjusting the environment variables according to the second adjustment rule,
wherein adjusting the environment variables according to the second adjustment rule comprises:
in response to an environment variable in the code construction command being a random number, building a target file system; and
replacing a file system corresponding to the code construction command with the target file system to allow files to be archived to have fixed node information.

6. The method of claim 5, wherein adjusting the environment variables according to the second adjustment rule comprises:
in response to an environment variable in the code construction command being a timestamp, setting system time corresponding to the code construction command to be fixed time.

7. The method of claim 5, wherein adjusting the environment variables according to the second adjustment rule comprises:
in response to an environment variable in the code construction command being a file list order, sorting at least one execution result corresponding to the code construction command with a sorting tool.

8. An apparatus, comprising:
one or more processors; and
a storage device configured to store one or more programs;

wherein the one or more programs, when executed by the one or more processors, cause the one or more processors to carry out the method of claim 5.

9. The apparatus of claim 8, wherein adjusting the environment variables according to the second adjustment rule comprises:
in response to an environment variable in the code construction command being a timestamp, setting system time corresponding to the code construction command to be fixed time.

10. The apparatus of claim 8, wherein adjusting the environment variables according to the second adjustment rule comprises:
in response to an environment variable in the code construction command being a file list order, sorting at least one execution result corresponding to the code construction command with a sorting tool.

11. An apparatus, comprising:
one or more processors; and
a storage device configured to store one or more programs;
wherein the one or more programs, when executed by the one or more processors, cause the one or more processors to:
generate at least two test construction commands according to different environment variables in a code construction command;
respectively execute the at least two test construction commands on a code, and adjust, in response to execution results being inconsistent, the code construction command according to the environment variables in the code construction command; and
execute the adjusted code construction command on the code,
wherein adjusting the code construction command according to the environment variables in the code construction command comprises:

searching a database according to the code construction command to obtain a first adjustment rule corresponding to the code construction command; and
adjusting each environment variable in the code construction command according to the first adjustment rule,
wherein adjusting each environment variable in the code construction command according to the first adjustment rule comprises:
in response to the code construction command comprising a timestamp, setting system time corresponding to the code construction command to be fixed time;
in response to the code construction command comprising a random number, building a target file system, and replacing a file system corresponding to the code construction command with the target file system to allow files to be archived to have fixed node information; and
in response to the code construction command comprising a file list order, sorting at least one execution result corresponding to the code construction command with a sorting tool.

12. The apparatus of claim 11, wherein generating the at least two test construction commands according to the different environment variables in the code construction command comprises:
tracking a code construction process, and monitoring the code construction command executed in the code construction process;
suspending, when the code construction command is acquired, execution of the code construction command; and
generating the at least two test construction commands according to the different environment variables in the code construction commands.

\* \* \* \* \*